(12) United States Patent
Bytyqi

(10) Patent No.: US 10,440,327 B1
(45) Date of Patent: Oct. 8, 2019

(54) METHODS AND SYSTEMS FOR VIDEO-CONFERENCING USING A NATIVE OPERATING SYSTEM AND SOFTWARE DEVELOPMENT ENVIRONMENT

(71) Applicant: Solaborate LLC, Fontana, CA (US)

(72) Inventor: Labinot Bytyqi, Fontana, CA (US)

( * ) Notice: Subject to any disclaimer, the term of this patent is extended or adjusted under 35 U.S.C. 154(b) by 0 days.

(21) Appl. No.: 16/108,057

(22) Filed: Aug. 21, 2018

(51) Int. Cl.
H04N 7/15 (2006.01)
H04N 5/232 (2006.01)
G06F 3/16 (2006.01)
G06F 3/14 (2006.01)

(52) U.S. Cl.
CPC ........... H04N 7/152 (2013.01); G06F 3/1454 (2013.01); G06F 3/167 (2013.01); H04N 5/23299 (2018.08)

(58) Field of Classification Search
CPC . H04N 7/15; H04N 7/14; H04N 5/232; G06F 3/14; G06F 3/16
USPC ............................ 348/14.01–14.16; 709/204
See application file for complete search history.

(56) References Cited

U.S. PATENT DOCUMENTS

| | | | | |
|---|---|---|---|---|
| 2004/0217946 A1* | 11/2004 | Hamano | ................ | G06F 17/242 345/173 |
| 2007/0009114 A1* | 1/2007 | Kenoyer | ........... | H04L 29/06027 381/122 |
| 2012/0081506 A1* | 4/2012 | Marvit | ...................... | H04N 7/15 348/14.12 |
| 2012/0166242 A1* | 6/2012 | Bentley | ............ | G06Q 10/06311 705/7.13 |
| 2013/0289986 A1* | 10/2013 | Graylin | ................... | H04M 1/05 704/235 |
| 2014/0146125 A1* | 5/2014 | Kristiansen | ......... | G06F 3/04883 348/14.03 |
| 2014/0270302 A1* | 9/2014 | Pocino | ................... | H04R 1/028 381/333 |
| 2015/0035987 A1* | 2/2015 | Fernandez | ............. | H04N 7/186 348/156 |
| 2017/0302597 A1* | 10/2017 | Veiga | .................. | H04L 49/9005 |
| 2018/0213361 A1* | 7/2018 | Venkat | ................... | G16H 40/20 |

* cited by examiner

Primary Examiner — Melur Ramakrishnaiah

(57) ABSTRACT

In an embodiment, a video-conferencing system may include a computing device, camera and networking capabilities integrated into a single set-top box unit. The system may receive first input audio data and first input video data via a network connection, the audio data and video data being captured at a location remote from the video-conferencing device; generate instructions to send the first input audio data and first input video data to a first display device coupled to the video-conferencing device; capture, using a camera of the video-conferencing device, output video data of an environment surrounding the video-conferencing device; capture, using a microphone array of the video-conferencing device, output audio data of the environment surrounding the video-conferencing device; and generate instructions to send the output video data and the output audio data to a remotely located receiving device.

20 Claims, 10 Drawing Sheets

METHODS AND SYSTEMS FOR VIDEO-CONFERENCING USING A NATIVE OPERATING SYSTEM AND SOFTWARE DEVELOPMENT ENVIRONMENT

TECHNICAL FIELD

This disclosure generally relates to methods and devices for networked video-conferencing.

BACKGROUND

Video conferencing devices have become increasingly available in office and home settings in recent years. Some devices fully integrated, with camera, microphone, and display as one device, while others are modular, in which the camera, microphone, and display are separated and/or offered as separate units. For example, there are currently many different types of gaming consoles, set top units, digital video recorders (DVRs), cable boxes, videoconferencing units, etc., all of which provide video signals to a video display, e.g., within a living room or conferencing room, or on a handheld device. Typically, these devices are large, cumbersome, and difficult to assemble and set up properly. They require many cables and an inappropriate amount of time to set up. Accordingly, the user is often left frustrated and unfulfilled by their current video-conferencing system.

SUMMARY OF INVENTION

Disclosed herein are embodiments for an integrated networked video-conferencing system including a standalone operating system and application programming interfaces (APIs) for providing a seamless video-conferencing experience. A video-conferencing device may include a high-resolution camera, a microphone array, a wireless receiver, a wired (e.g., HDMI) or wireless output, and processing units. The processing units may be capable of performing various software implemented tasks on an operating system that is native to the video-conferencing device. Such tasks may include transmitting and receiving audio and video data and outputting the audio and video data for a display device (e.g., television, HELLO TOUCH, which is a 4K Touch TV for real time collaboration, whiteboarding, video conferencing, and wireless sharing), recording participants of a video conference session and transmitting a live or pre-recorded recording to a remote receiving device, integration with third party software and applications, (e.g., GOOGLE DRIVE), hands-free calling with a voice assistant that is native to the video-conferencing device, different usage modes, tilting and zooming of the camera of the video-conferencing device, dual screen modes, the receipt and display of user-generated content (e.g., "digital whiteboarding"), home automation, face detection and voice recognition, consumer electronic control, Session Initiation Protocol (SIP) integration, and near field communication. Other features include motion sensors and notifications based on detected motion, microphone sensors and notifications based on detected noise, and live broadcasting.

To implement the above features, a communications system may include a video-conferencing device that has a camera, a microphone array, and one or more processors operable to execute instructions from a memory medium, wherein when executing the instructions, the processors perform various operations. As a first example, the processors may perform operations including (1) receiving first input audio data and first input video data via a wireless data connection, the audio data and video data being captured at a location remote from the video-conferencing device; (2) generating instructions to send the first input audio data and first input video data to a first display device coupled to the video-conferencing device via a wired connection (e.g., HDMI); (3) capturing, using the camera, output video data of an environment surrounding the video-conferencing device; (4) capturing, using the microphone array, output audio data of the environment surrounding the video-conferencing device; (5) generating instructions to send the output video data and the output audio data to a remotely located receiving device; (6) generating instructions to offer an application program interface (API) to one or more third-party entities, wherein the API allows the one or more third-party entities to control a tilt of the camera or a zoom of the camera; (7) receiving a request via the API from a remote participant of a current video-communication session to tilt or adjust the zoom of the camera; and (8) in response to the request, tilting or adjusting the view of the camera in accordance with the request.

DETAILED DESCRIPTION OF INVENTION

In some embodiments, a video-conferencing device may include a camera, a microphone array, a wireless receiver, a wired (e.g., HDMI) or wireless output, and processing units. The processing units may be capable of performing various software implemented tasks on an operating system that is native to the video-conferencing device. Such tasks may include transmitting and receiving audio and video data and outputting the audio and video data for a display device (e.g., television), recording participants of a video conference session and transmitting a live or pre-recorded recording to a remote receiving device, integration with third party software and applications, (e.g., GOOGLE DRIVE), hands-free calling with a voice assistant that is native to the video-conferencing device, different usage modes, tilting and zooming of the camera of the video-conferencing device, dual screen modes, the receipt and display of user-generated content (e.g., "digital whiteboarding"), home automation, face detection and voice recognition, consumer electronic control, Session Initiation Protocol (SIP) integration, and near field communication. Other features include motion sensors and notifications based on detected motion, microphone sensors and notifications based on detected noise, and live broadcasting.

To implement the above features, a communications system may include a video-conferencing device that has a camera, a microphone array, and one or more processors operable to execute instructions from a memory medium, wherein when executing the instructions, the processors perform various operations. As a first example, the processors may perform operations including (1) receiving first input audio data and first input video data via a wireless data connection, the audio data and video data being captured at a location remote from the video-conferencing device; (2) generating instructions to send the first input audio data and first input video data to a first display device coupled to the video-conferencing device via a wired (e.g., HDMI) connection; (3) capturing, using the camera, output video data of an environment surrounding the video-conferencing device; (4) capturing, using the microphone array, output audio data of the environment surrounding the video-conferencing device; and (5) generating instructions to send the output video data and the output audio data to a remotely located receiving device; (6) generating instructions to offer an application program interface (API) to one or more third-party entities, wherein the API allows the one or more third-party entities to control a tilt of the camera or a zoom of the camera; (7) receiving a request via the API from a remote participant of a current video-communication session to tilt or adjust the zoom of the camera; and (8) in response to the request, tilting or adjusting the view of the camera in accordance with the request.

Figure 1:
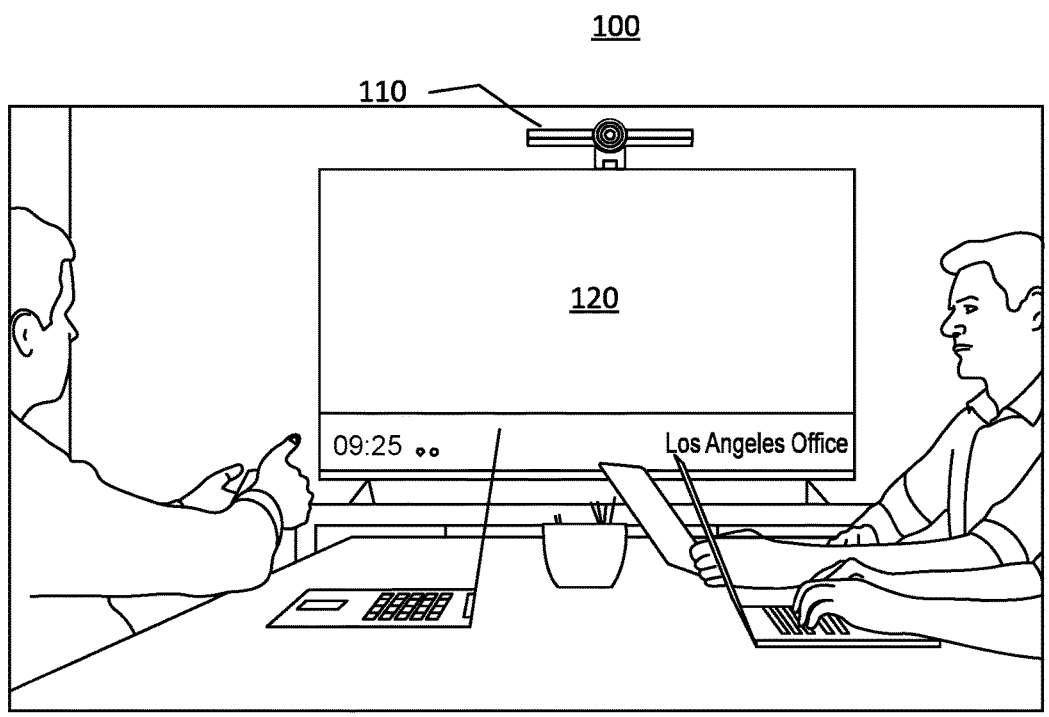
FIG. 1 illustrates an example environment for a video-communication device.

FIG. 1 illustrates an example environment 100 for a video-communication device 110. The example environment 100 may be any suitable environment where people may gather. Examples of suitable environments include living rooms, offices, conference rooms, backyard patios, or any other suitable environment. The video-communication device 110 may operate by using a power connection, an Internet connection, and a wired (e.g., HDMI) or wireless connection (e.g., via an HDMI cord) to a display screen, such as a television 120. The environment 100 may include any suitable number of people, each of whom may participate in the video-conferencing session. A microphone array on the video-conferencing device 110 may enable the video-conferencing device to pinpoint the location of a participant using audio beamforming techniques. As an example and not by way of limitation, a first participant may be located to the right of the video-conferencing device 110 and a second person may be located to the left of the video-conferencing device. When the first participant is speaking, the video-conferencing device 110 may be able to determine that the sound is coming from the right of the video-conferencing device 110 because the microphone array may include several microphones located at different positions along the video-conferencing device 110. When the first participant speaks, the sound coming from the first participant may reach the microphones on the right side of the video-conferencing device 110 before the sound reaches the microphones on the left side of the video-conferencing device 110. Based on the time delay between when the sound reaches the right side and when the sound reaches the left side, the video-conferencing device 110 may be able to determine the direction from which the sound is emitted. The video-conferencing device 110 may be able to beamform its audio toward the emitted sound so that the first participant's voice sounds loud and clear to the other participants on the video-conference call. In some embodiments, the video-conference device 110 may also use the audio location of the first participant to automatically turn (either mechanically or electronically) the camera toward the participant who is speaking. This may enable the viewers on the other end of the video-conferencing session to view the speaker more closely.

Figure 2:
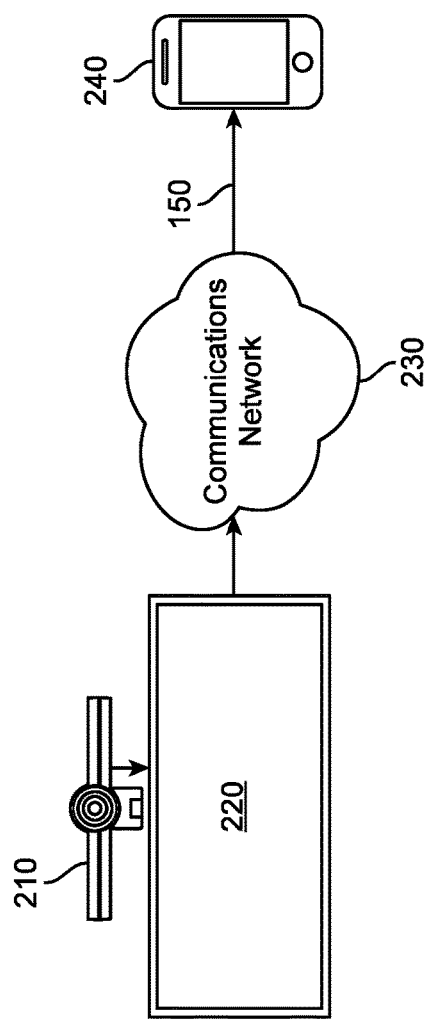
FIG. 2 illustrates an example network environment in which a video-communication device may operate.

FIG. 2 illustrates an example network environment in which a video-communication device may operate. The network environment may include a video-conferencing device 210, a display screen 220 (e.g., television), a communication network 230, and a client device 240. Note that the client device 240 may be a receiving or a transmitting device, or may both receive and transmit information simultaneously, as video and audio of the participants at the end of receiving device 240 may be transmitted over communications network 230 to video-conferencing device 210 and ultimately output via display screen 220. In some embodiments, the network environment may include multiple client devices 240 and multiple video-conferencing devices 210 which all participate in the same video-conferencing session. For example, a video-conferencing device may be located in San Diego, Calif., another video-conferencing device may be located in Paris, France, a client device 240 may be located in Dallas, Tex., and another client device 240 may be located in Mexico City, Mexico. All four devices may join the same video-conferencing session.

The client devices 240 are one or more computing devices capable of receiving user input as well as transmitting and/or receiving data via the network 230. In one embodiment, a client device 240 is a conventional computer system, such as a desktop or a laptop computer. Alternatively, a client device 240 may be a device having computer functionality, such as a personal digital assistant (PDA), a mobile telephone, a smartphone or another suitable device. A client device 240 is configured to communicate via the network 230. In one embodiment, a client device 240 executes an application allowing a user of the client device 240 to interact with the video-conferencing device and applications running on the video-conferencing device 210. For example, a client device 240 executes a browser application to enable interaction between the client device 240 and an application running on the video-conferencing device 210 via the communications network 230. In another embodiment, a client device 240 interacts with the video-conferencing device 210 through an application program interface (API) running on a native operating system of the client device 240, such as IOS® or ANDROID™ Client device 240, video-conferencing device 210, and communications network 230 may communicate with each other via links 250, which may be any type of suitable communication link, including Ethernet, wireless connections, 3G/4G/LTE connections, or any other type of suitable communication connection.

Display screen 220 may include a display and one or more speakers to emit audio data that is captured at device 240. Communication network 230 may be any suitable communication network, including any combination of local area and/or wide area networks, using both wired (e.g., HDMI) and/or wireless communication systems. In one embodiment, the network 230 uses standard communications technologies and/or protocols. For example, the network 230 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 230 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 230 may be represented using any suitable format, such as hypertext markup language (HTML) or extensible markup language (XML). In some embodiments, all or some of the communication links of the network 230 may be encrypted using any suitable technique or techniques.

Figure 3:
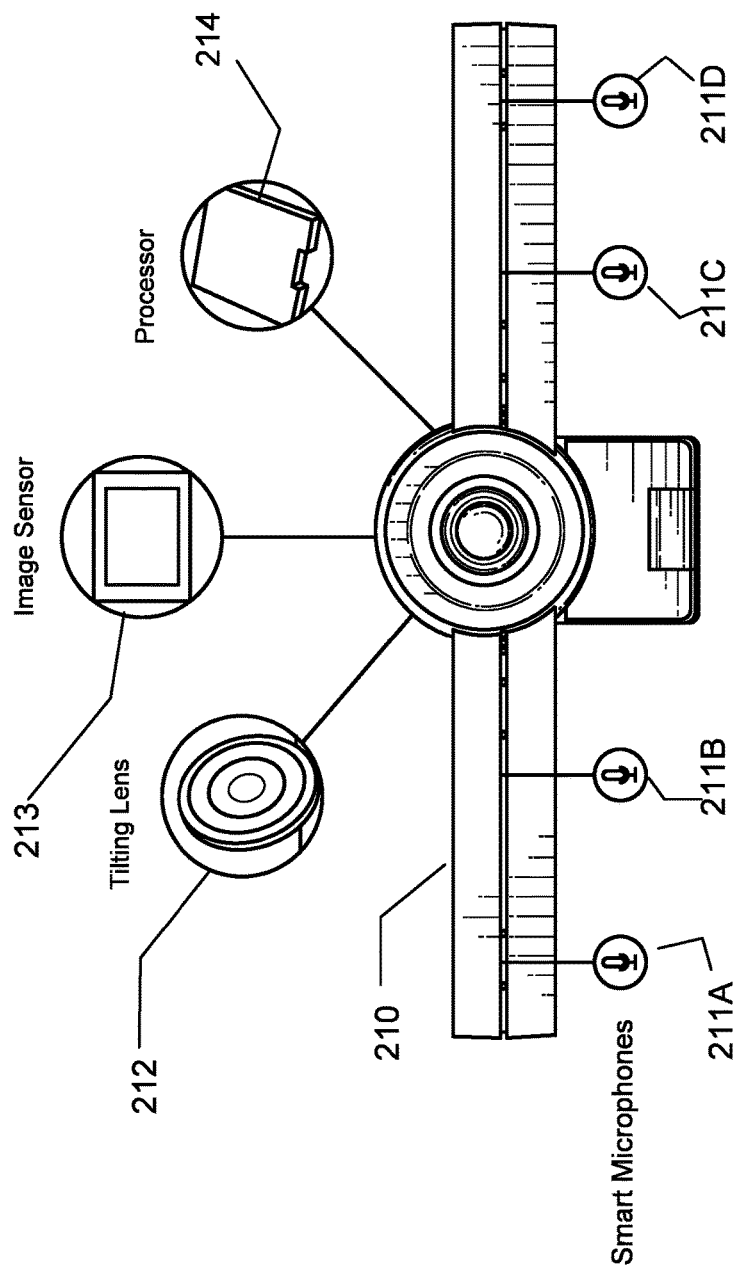
FIG. 3 illustrates an example video-communication device with example hardware elements.

FIG. 3 illustrates an example video-communication device 210 with example hardware elements. The video-communication device may include a microphone array, a tilting lens 212, a high resolution image sensor 213 (e.g., 4K image sensor), and a processor 214 (e.g., high power System-on-a-Chip (SoC), Multiple Core Processor, etc.). The microphone array may include two or more microphones 211A-D located at different locations on the video-conferencing device. For example, the microphone array may have four microphones 211A-D: one located on the left side of the video-conferencing device 210, one located at the left-center of the video-conferencing device 210, one located at the right-center of the video-conferencing device 210, and one located at the right side of the video-conferencing device 210, as is illustrated in FIG. 3. The microphone array may be "smart" because it may be capable of pinpointing the direction from which a participant is speaking. For example, a first participant may be located to the right of the video-conferencing device 210 and a second person may be located to the left of the video-conferencing device 210. When the first participant is speaking, the video-conferencing device 210 may be able to determine that the sound is coming from the right of the video-conferencing device because the microphone array may include several microphones 211 located at different positions along the video-conferencing device. When the first participant speaks, the sound coming from the first participant may reach the microphones 211C, 211D on the right side of the video-conferencing device before the sound reaches the microphones 211A, 211B on the left side of the video-conferencing device. Based on the time delay between when the sound reaches the right side and when the sound reaches the left side, the video-conferencing device 210 may be able to determine the direction from which the sound is emitted. The video-conferencing device 210 may be able to beam-form its audio toward the emitted sound so that the first participant's voice sounds loud and clear to the other participants on the video-conference call. In some embodiments, the video-conference device 210 may also use the audio location of the first participant to automatically turn (either mechanically or electronically) the camera 212 toward the participant who is speaking. This may enable the viewers on the other end of the video-conferencing session to view the speaker more closely. The tilting lens 212 may be a high-quality glass or plastic or fiberglass lens that is equipped with one or more actuators to tilt the lens in any suitable direction. In particular embodiments, tilting lens 212 may physically rotate in the up, down, left, and right directions. Furthermore, video-conferencing device 210 may include physical sensors positioned around the lens that when pressed or tapped by a user cause the lens to rotate in a corresponding direction. As an example, if a user touches the right side of the lens, the camera may rotate to the right while the user maintains the touch.

In particular embodiments, video-conferencing device 210 further includes one or more physical hardware privacy buttons for deactivating video and/or audio input into the device 210. This privacy button may deactivate the camera and/or microphones at a hardware level without the possibility of reactivating it through software. For example, a privacy button may open a switch on a circuit that delivers power to the camera and/or microphones, while keeping the switch inaccessible through software. In this manner, device 210 provides a mechanism to ensure user privacy in a manner that is impervious software means or attacks (e.g., hacking, malware, etc.).

Figure 4A:
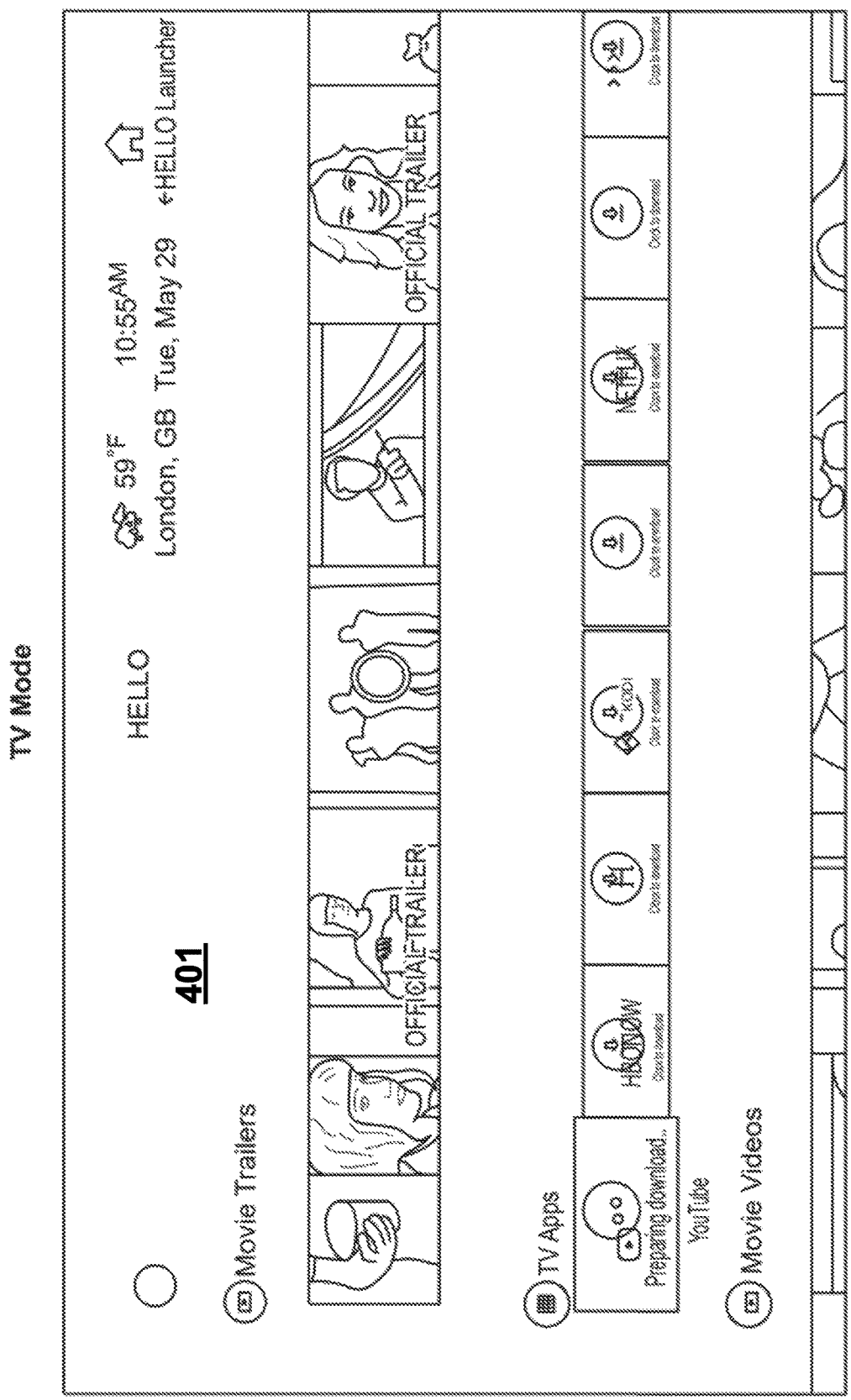
FIGS. 4A and 4B illustrates example modes for a user interface associated with the video-conferencing system.
Figure 4B:
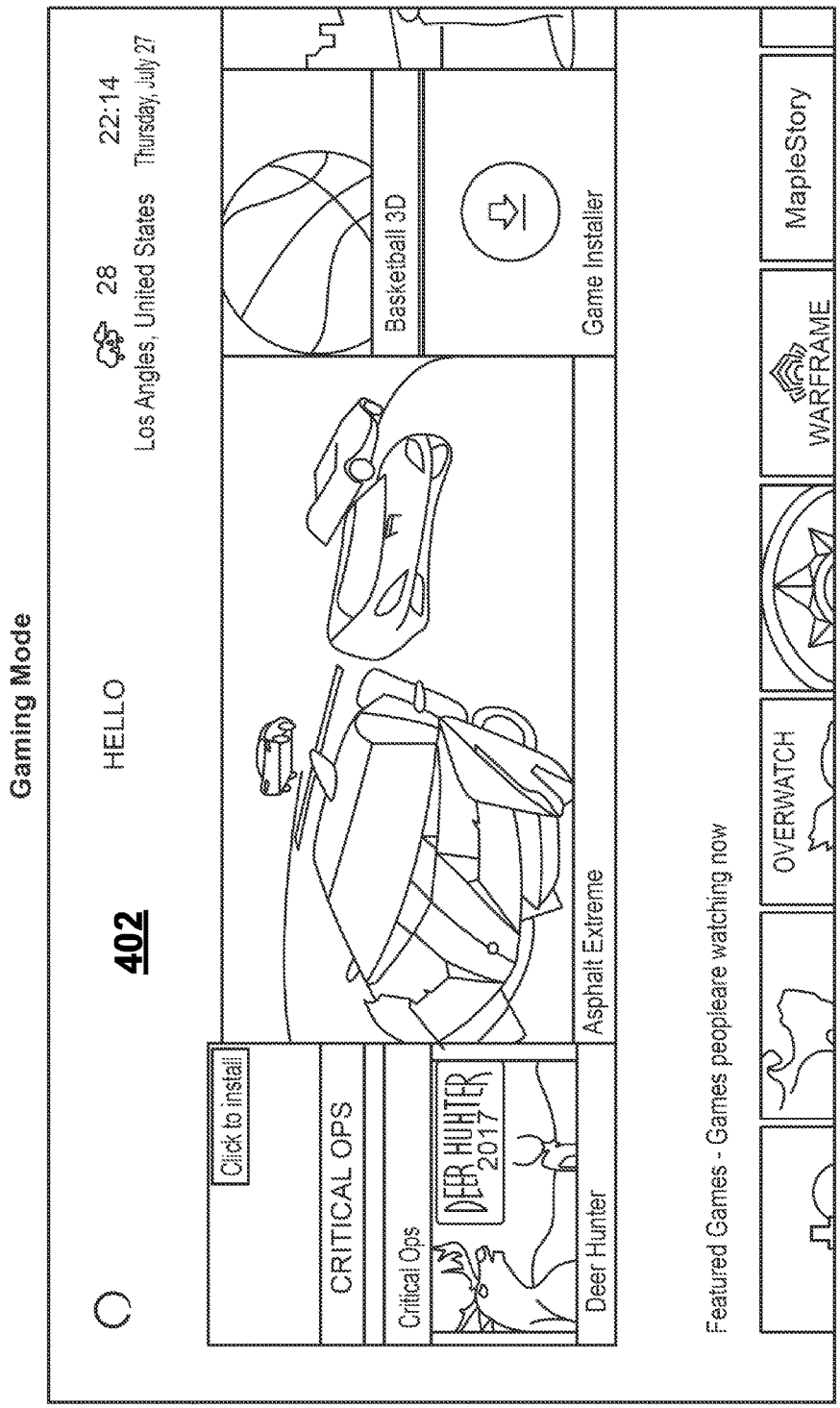

FIGS. 4A and 4B illustrates example modes 401, 402 for a user interface associated with the video-conferencing system. An operating system of the video-conferencing device may have two modes of operation. A first mode of the two modes of operation may be a "television mode" 401, in which a user may stream videos including many television channels. The second mode may be a "gaming mode" 402. The gaming mode may be a mode in which a user may play games, either over the Internet, or on the operating system itself. These modes 401, 402 exist apart from a main home screen (not illustrated) associated with the video-conferencing device. The main home screen may be a main menu interface from which a user may select from a plurality of options, such as entering one of the two modes discussed above, making a call, joining a video-conference session, initiating a video-conferencing session, accessing a number of third party applications (e.g., SKYPE, GOOGLE DRIVE, FACEBOOK, YOUTUBE, and the like). The two modes (e.g., gaming mode 402 and television mode 401) allow a user to switch between gaming and television at his or her leisure. The gaming mode 402 includes several games with can be downloaded and played using a wireless controller associated with the video-conferencing device. In some embodiments, the wireless controller may be the user's personal computing device (e.g., his or her smartphone). The television mode 401 may include different application program interfaces (APIs) from the Internet which may be updated regularly. The user may select which content he or she is interested in viewing. The television mode 401 may additionally include television streaming applications such as NETFLIX, HULU, HBO NOW, as well as music streaming applications such as PANDORA and SPOTIFY, among others.

Figure 5:
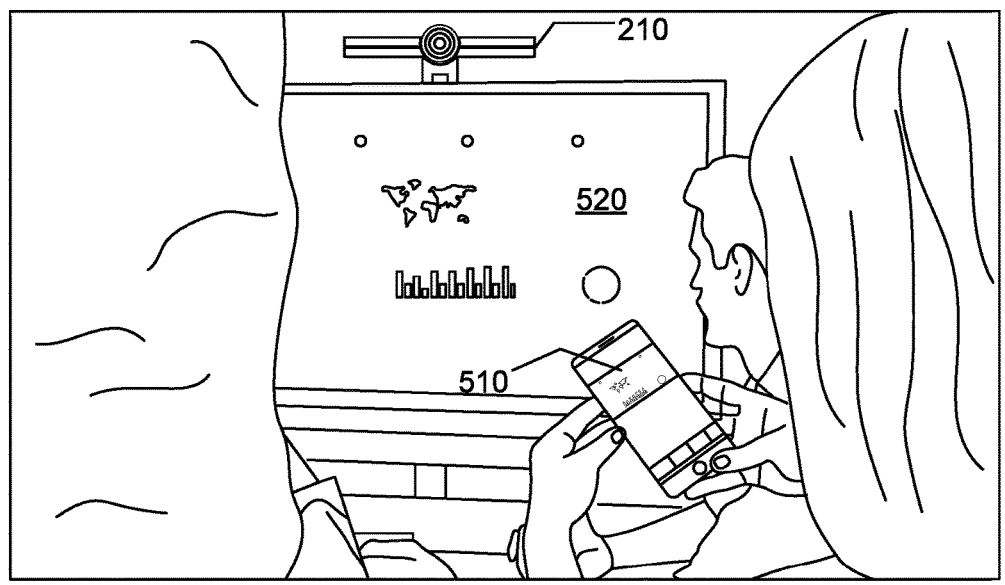
FIG. 5 illustrates an example use case for transferring a displayed interface from a personal computing device to a display screen associated with the video-conferencing device.

FIG. 5 illustrates an example use case for transferring a displayed interface from a personal computing device 510 to a display screen 520 associated with the video-conferencing device 210. The user may screen share or screen cast what is being displayed on her personal computing device 510 onto the display screen 520 associated with the video-conferencing device 210. To transfer what is being displayed on a personal computing device 510 onto the display screen 520 associated with the video-conferencing device 210, if the personal device has a touch screen, the user may simply need to swipe up on the display screen of his or her personal computing device 510. If the personal device 510 and the video-conferencing device 210 are configured appropriately, the swipe up may be all that is needed to execute the display transfer. Thus, in some embodiments, the video-conferencing system may receive an indication from a user to transfer a communication session from a personal device 510 to the video-conferencing device 210, wherein the indication comprises a swipe on a touch screen of the personal device 510. Then, in response to receiving the indication, software employed on the video-conferencing device 210 may transfer the communication session from the personal device 510 to the video-conferencing device 210 without an interruption in the communication session. In some embodiments, what is displayed may be a communication session or may be a web page, a document, or any other suitable object. In some embodiments, the personal device 510 may display a menu with a request for the user to select to screen share with the desired video-conferencing device 210. For example, the user may have two video-conferencing devices, one for the living room, and one for the home office. Swiping up on her personal computing device 510 may cause the menu to be displayed with a message requesting the user to select to screen share with either the video-conferencing device in the living room or the video-conferencing device in the home office.

Figure 6:
FIG. 6 illustrates an example use case for a motion-detection notification.

FIG. 6 illustrates an example use case for a motion-detection notification 511. In some embodiments, the user can configure the video-communications device 210 to monitor the environment surrounding the video-communications device by enabling the camera 212 to capture video data and the microphones 211A-D to capture audio data. This may be useful in situations in which the user is away from the environment. For example, if the video-communication device 210 is located in the user's living room, the user may configure the video-communication device 210 to monitor the living room while the user is away at a job or otherwise out of the home. When the video or audio contains activity that rises about a threshold level, the video-conferencing device may be configured to send a notification 511 to the user notifying the user that activity has been detected in the environment of the video-conferencing device. In the example of FIG. 6, the user's dog was moving around the environment and triggered the motion-detection notification. The video-conferencing device then sent a notification 511 to the user that said, "HELLO ALERT: Check on your dog. She is very active." This is an example only, and the notification may include any suitable communication. Examples of other communications include "Activity detected in your living room," "Movement detected in your living room," and the like. In some embodiments, the video-conferencing device 210 may perform facial or voice recognition to attempt to identify the cause of any detected movement. For example, the user may be at work and the video-conferencing device 210 may be located in the user's home living room. Someone may enter the living room and the video-conferencing device 210 may perform facial recognition on the person's face. If the person is a friend of the user (e.g., as determined via a social networking application), the video-conferencing device may send a notification to the user signaling that a friend just entered their home. For example, "Your friend Amanda just entered your house" the user interface on the user's personal device may present an option to view a live stream of the environment visible by the video-conferencing device 210. The user may then be presented with the option to view the camera feed of the video-conferencing device and may also be able to activate the video-conferencing device to communicate with the friend via the video-conferencing device. If the person is not recognized, the video-conferencing device may send a message stating as much. For example, the message may state, "An unrecognized person just entered your house." The user may then be presented with the option to view the camera feed of the video-conferencing device 210 and may also be able to activate the video-conferencing device 210 to communicate with the person via the video-conferencing device. The user may also be presented with an option to contact emergency services such as the police department if the user wishes to do so (e.g., in the case of a burglary).

Figure 7:
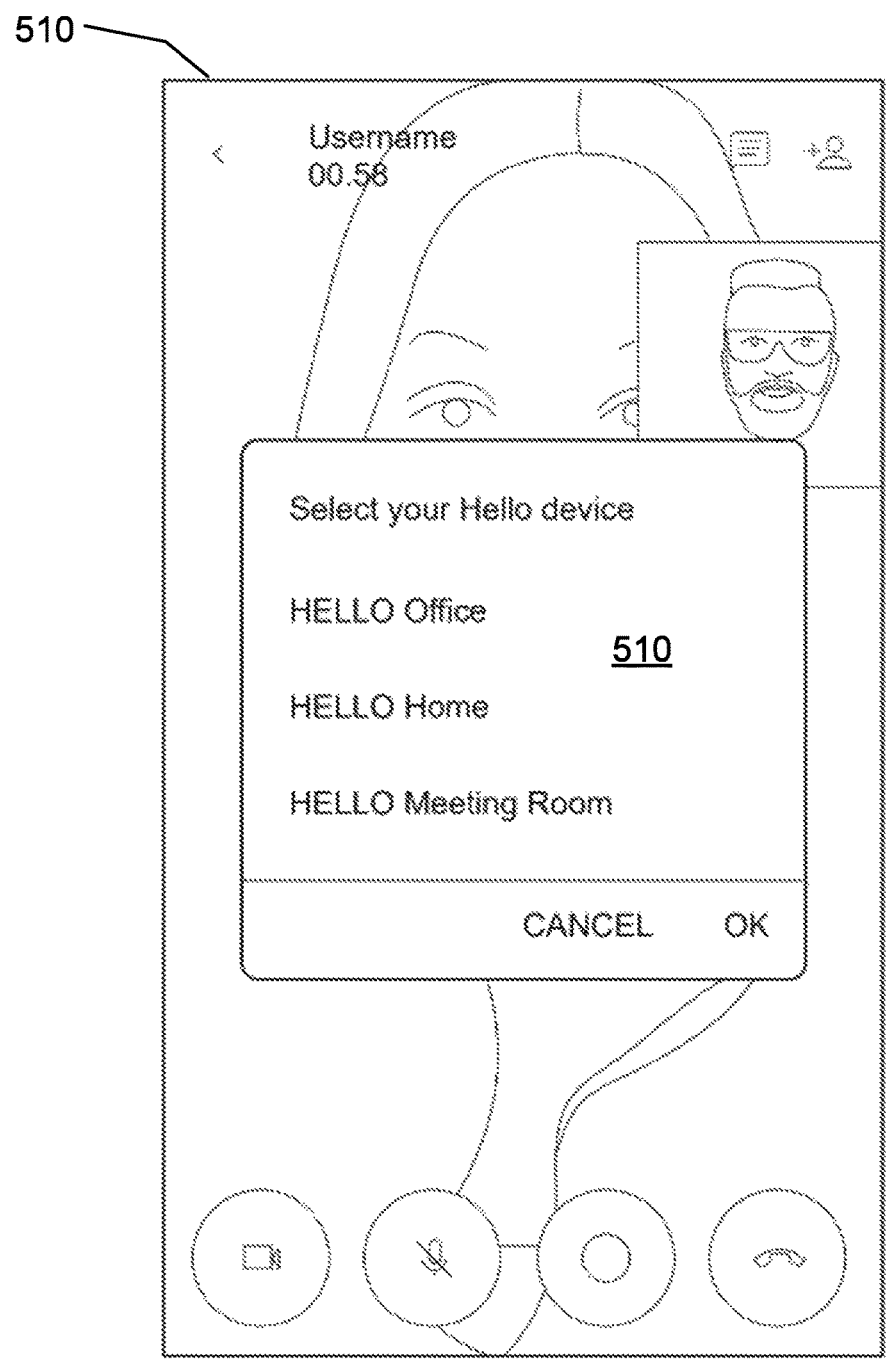
FIG. 7 illustrates an example use case for transferring a communication session from a personal computing device to a display screen associated with the video-conferencing device.

FIG. 7 illustrates an example use case for transferring a communication session from a personal computing device to a display screen associated with the video-conferencing device. During a communication session (e.g., audio or audio-visual) between two or more participants, a user may transfer the communication session from her personal client device 510 to the video-communication device 210. To transfer the communication session from her personal client device to the video-communication device, if the personal device has a touch screen (e.g., on a smartphone), the user may simply need to swipe up on the display screen of his or her personal computing device. If the personal device and the video-conferencing device are configured appropriately, the swipe up may be all that is needed to execute the communication session transfer. Thus, in some embodiments, the video-conferencing system may receive an indication from a user to transfer a communication session from a personal device 510 to the video-conferencing device 210, wherein the indication comprises a swipe on a touch screen of the personal device. Then, in response to receiving the indication, software employed on the video-conferencing device may transfer the communication session from the personal device to the video-conferencing device without an interruption in the communication session. In some embodiments, the personal device may display a menu 520 with a request for the user to select to screen share with the desired video-conferencing device. For example, the user may have two video-conferencing devices, one for the living room, and one for the home office. Swiping up on her personal computing device may cause the menu 520 to be displayed with a message requesting the user to select to screen share with either the video-conferencing device in the living room or the video-conferencing device in the home office. In particular embodiments, the video-conferencing system and/or the personal device may provide automated mechanisms for choosing the video-conferencing system to communicate with, such as, ultrasound recognition, near-field communication, etc. As an example, a video-conferencing system may emit ultrasounds signals, and analyze the bounce-back sounds to determine that a particular personal device is nearby. While particular methods of connecting a personal device to one of multiple video-conferencing devices have been described, this disclosure contemplates any suitable method of connecting a personal device to one of multiple video-conferencing devices.

Figure 8:
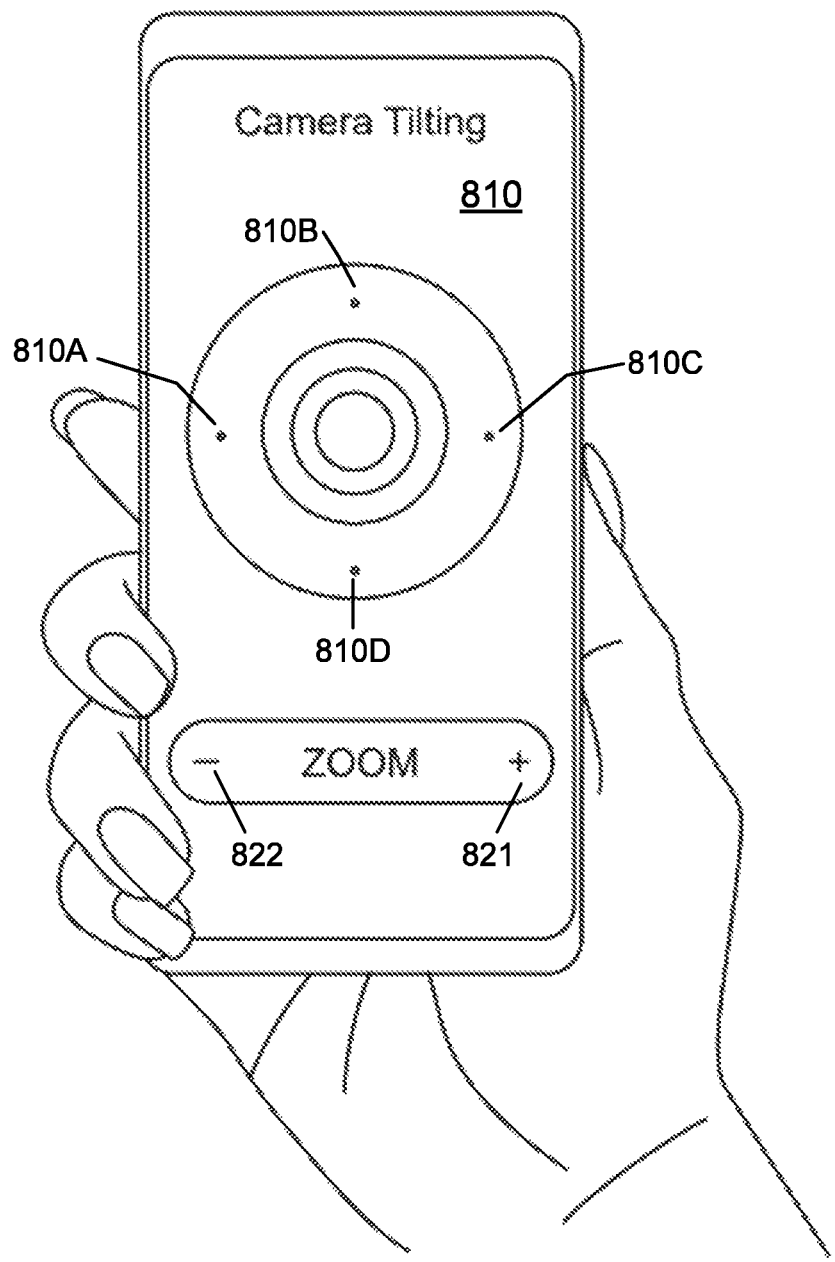
FIG. 8 illustrates an example interface for tilting and zooming a camera of the video-conferencing device.

FIG. 8 illustrates an example interface for tilting and zooming a camera of the video-conferencing device. The example interface may include a representation 810 of the camera lens 212 that is installed on the video-conferencing device 210. The representation 810 may include several icons 810A-D around the periphery of the camera lens. In some embodiments, the user may tap any of these icons 810A-D to cause the actual camera 212 of the video-conferencing device to tilt (either mechanically or electronically). For example, if the user wants to tilt the camera 212 down, she may tap the icon 810D located just below the representation of the camera. This may cause the camera 212 to tilt downward a set number of degrees (e.g., 5 degrees). In some embodiments, if the user presses and holds on the icon 810D, the camera of the video-conferencing device may continue to move downward at a speed of a few degrees per second until the camera has reached the limit of its tilting capability (e.g., 20 degrees in any direction). In some embodiments, if the user presses two of the icons simultaneously (e.g., the left icon 810A and top icon 810B), the camera 212 of the video-conferencing device 210 may tilt in a diagonal path (e.g., up and to the left). This way the user may control the tilt of the camera 212 of the video-conferencing device 210 in many different directions. Thus, the communication system may receive user input indicating a change in direction of the camera 212, and in response, may tilt the camera 212 in accordance with the user input. In some embodiments, the same functionality may apply to the zoom of the camera 212. The zoom may be an optical zoom or an electronic zoom. If the user taps on the "plus" icon 821 in the user interface illustrated in FIG. 8, the camera 212 may zoom in, either optically or electronically. If the user taps on the "minus" icon 822 in the user interface illustrated in FIG. 8, the camera 212 may zoom out, either optically or electronically. In some embodiments, the operating system uses APIs that allow third-parties to control tilting of the camera 212 via an integrated Messenger App as well. Apart from having the chance to control tilting the user is offered the digital zoom feature which may allow her to zoom in at any time. This allows a remote user to control the tilt and zoom of the camera 212. This may increase the enjoyment for the conference participants, since they may be able to focus on and zoom in on any subject they desire.

In some embodiments, the tilt and zoom may occur automatically by the processors inside the video-conferencing device. For example, a first participant may be located to the right of the video-conferencing device 210 and a second person may be located to the left of the video-conferencing device 210. Location of these users may be determined either by the video data, the audio data, or a combination of the video and audio data. For example, when the first participant is speaking, the video-conferencing device may be able to determine that the sound is coming from the right of the video-conferencing device because the microphone array may include several microphones located at different positions along the video-conferencing device. When the first participant speaks, the sound coming from the first participant may reach the microphones on the right side of the video-conferencing device before the sound reaches the microphones on the left side of the video-conferencing device. Based on the time delay between when the sound reaches the right side and when the sound reaches the left side, the video-conferencing device may be able to determine the direction from which the sound is emitted. Alternatively, the video-conferencing device may be able to identify the participants and record their locations relative to the video-conferencing device. In this way, the video-conferencing device need not rely solely on sound for localization of participants. The video-conferencing device may be able to beamform its audio toward the emitted sound so that the first participant's voice sounds loud and clear to the other participants on the video-conference call. In some embodiments, the video-conference device may also use the audio location of the first participant to automatically turn (either mechanically or electronically) the camera toward the participant who is speaking. This may enable the viewers on the other end of the video-conferencing session to view the speaker more closely.

Figure 9:
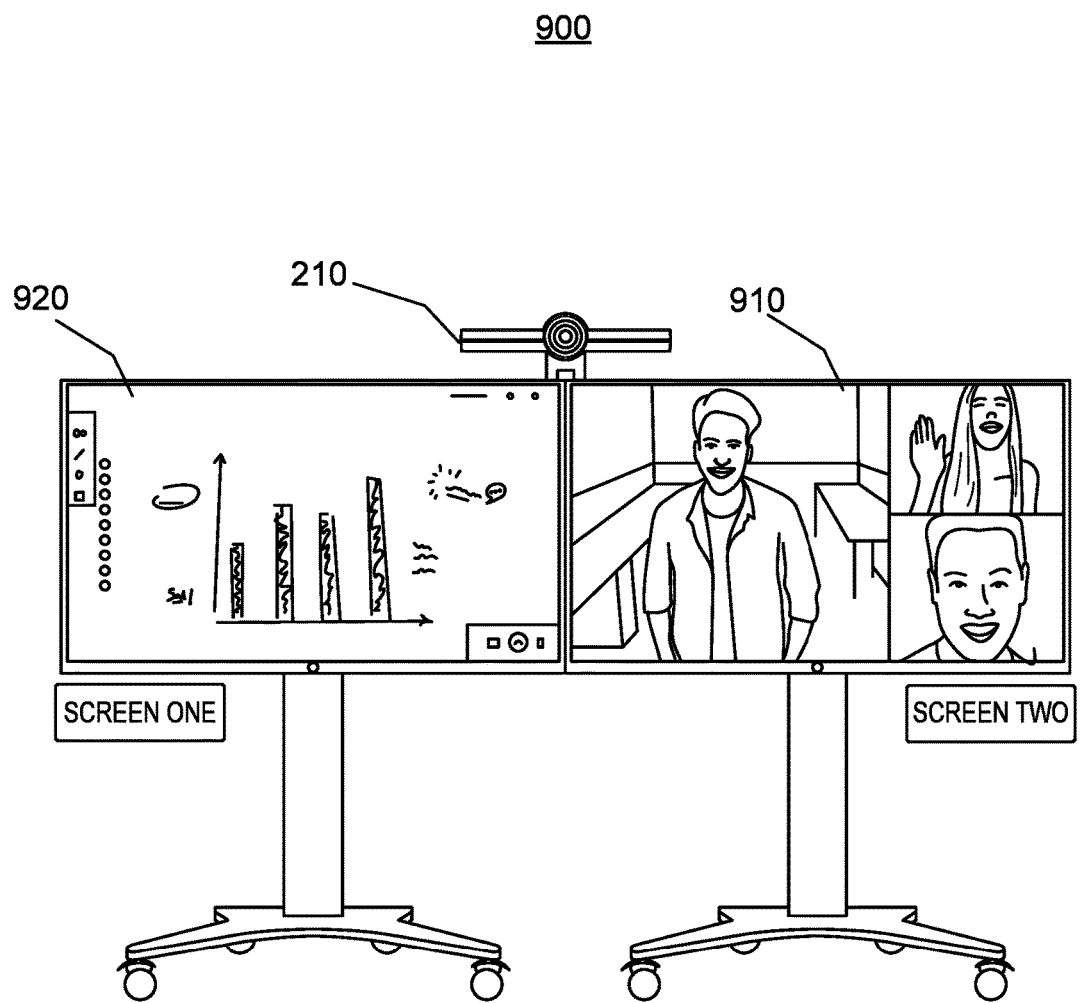
FIG. 9 illustrates an example dual-screen mode for a conferencing session involving the video-conferencing device.

FIG. 9 illustrates an example dual-screen mode 900 for a conferencing session involving the video-conferencing device 210, a first display device 910, and a second display device 920. In some embodiments, processors on the video-conferencing device may generate instructions to send second input video data and second input audio data to the second display device 920 coupled to the video-conferencing device and the first display device 910 via one or more wired connections (e.g., HDMI). This may enable dual-screen conferencing. On a first screen 910, the video conferencing session may be displayed. On the second screen 920, user-generated content may be displayed. Examples of user-generated content may include a "digital whiteboard," where participants may draw, add text, or add online resources (e.g., web pages, online data, photos, and the like). The digital whiteboard may be editable by all the participants, or by only a subset of the participants. Permission to edit the digital whiteboard may be granted by the creator of the current video-conferencing session. To join a digital whiteboarding session, a user may join by user ID, using the user ID that is unique to the operating platform of the video-communication device.

In particular embodiments, users may edit the user-generated content by tapping, sliding their finger, or doing any other suitable action to the display screen, assuming the displays screen is also a touch screen. In particular embodiments, the dual-screen mode discussed above may be collapsed into a single screen. Thus, instead of using two screens, the participants may use a single screen that is split between a video-conferencing session and a user-generated content portion. Thus, a video depicting one or more participants of a video-conferencing session may displayed on a first display screen at the same time as a user-generated content is displayed on the first display screen. In some embodiments, the video-conferencing device, via one or more processors, may access information in a third-party database and generate instructions to send the information in the third-party database to a first display device coupled to the video-conferencing device via a wired connection (e.g., HDMI). An example of this may be to access a GOOGLE DRIVE document and generate instructions for it to be displayed on the display screen during a video communication session.

In some embodiments, GOOGLE ASSISTANT may be integrated into the video-conferencing device and its operating system. To configure GOOGLE ASSISTANT, the user may need to launch an application on their personal device. The application may be the HELLO Solaborate Messenger app. By way of example, the user may then perform the following functions to integrate Google Assistant: (1) Select the HELLO tab; (2) select Google Assistant; (3) sing in or sign up to Google; (4) view a confirmation message saying that Google Assistant has been successfully set up; (5) begin using Google Assistant by asking audible questions, beginning with "Okay Google." The video-conferencing device may be unique from other devices in that it has the ability to have multiple Voice Assistants (e.g., Google Assistant, ALEXA on Amazon, the native HELLO Voice Assistant) and use them at the same time. For example, a user may say, "OK Google, what's the weather?" As well as "Alexa, what's the weather," as well as asking "HELLO, What's the weather?" Any of the voice assistants are capable of responding to these respective questions. In the above example, the keyword "HELLO" triggers the HELLO Voice Assistant.

In some embodiments, a user may interact with the video-conferencing device using voice commands. This may enable hands-free calling using, as an example, the HELLO Assistant. The video-conferencing device may receive a voice command from a user of the video-conferencing device through the microphone array of the video-conferencing device, (e.g., "HELLO, Call Dan Smith"). Processors on the video-conferencing device may then analyze a waveform of the voice command and, based on the analysis of the waveform of the voice command, match the voice command to a user of the video-conferencing device. Thus, the video-conferencing device may be able to identify the user who is speaking the voice command. For example, the user may state, "call mom." The video-conferencing device may identify the user and thus may also identify the user's mom. If a second user says "call mom," that user may have a different mother, and the video-conferencing device may be able to determine this by identifying the second user and determining who the user's mom is (e.g., via a social networking website). The video-conferencing device may then call that user's mom instead of the first user's mom. In some embodiments, the video-conferencing device may receive a voice command from a user of the video-conferencing device through the microphone array. The video-conferencing device may then categorize the voice command into one of a plurality of predetermined voice-command categories. The plurality of predetermined voice-command categories may include any suitable category, such as calling a contact of the user (e.g., "call mom"), launching an application (e.g., "start NETFLIX"), retrieving information from the Internet (e.g., "How tall is Neymar?"), playing music (e.g., "play my weekend mix"), playing video (e.g., "play my subscribed YOUTUBE videos"), or starting a video-conferencing session (e.g., "start a video chat with Karen").

In some embodiments the voice commands may relate to home automation (turn on/off the lights, air conditioner). The HELLO video conferencing device may offer ZIGBEE connectivity, which is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network. In some embodiments, some of these commands may be performed automatically, without input from the user. For example, if the user comes home and it is night time, the video-conferencing device may automatically turn on the lights, or may automatically turn on the heater or air conditioning unit, play music, or do any other suitable action.

In some embodiments, an application for iOS or ANDROID may allow a user to control the video-conferencing device from their personal computing device. If a user has downloaded this application (e.g., from the APPLE app store, GOOGLE PLAY store), the user may launch the application and view any upcoming video-conferencing sessions for any particular video-conferencing devices. They may also schedule video-conferencing session with the application, start or join a video-conferencing session, start or join a digital whiteboarding session, make phone calls, or launch other applications as discussed herein.

In some embodiments, the video-conferencing device may start a video-conferencing session based on face recognition. The video-conferencing device may have stored in memory the identities of the participants scheduled to be part of an upcoming video-conferencing session. When a user who is a participant of the video-conferencing session enters the environment of the video-conferencing device, the video-conferencing device may identify the user as a participant and may automatically initiate the video-conferencing session or may automatically add the participant to an ongoing video-conferencing session. Another feature that may be used in conjunction with voice detection may be automatically unlocking a video-conferencing device when a recognized user enters the environment of the video-conferencing device. The video-conferencing device may immediately perform face recognition on the user enters the room. If the user is recognized and trusted, the video-conferencing device may automatically unlock and activate with a personalized message for the user. For example, the display screen may turn on and say either in text or audibly, "Welcome home, Andrew." In some embodiments, multiple video-conferencing devices may synchronize authorized users and share the authorized users among the multiple video-conferencing devices. By recording the voices of these users, the video-conferencing devices may authenticate and match the user that matches the detected voice.

In some embodiments, the video-conferencing device may enable session initiation protocol (SIP) integration. SIP is a communication protocol for signaling and controlling multimedia communications sessions in applications of internet telephone for messaging, voice and video calls. The video-conferencing device may enable users to configure their own SIP providers and make calls directly to a phone number. The video-conferencing device may have its own softphone number assigned to it, which may allow the users to join in any communication session and receive requests to initiate communications from other users as well. In some embodiments, Near Field Communication (NFC) may be enabled on the video-conferencing device as well. NFC is a set of communication protocols that allow two devices to establish a communication if they are close to each other. Through NFC, a user may be able to use the video-conferencing device in several ways, including, but not limited to: logging in to her video-conferencing device (e.g., by placing her personal computing device in close proximity to the video-conferencing device), switching accounts, transferring files, adding a Wi-Fi network, and launching a website URL.

Figure 10:
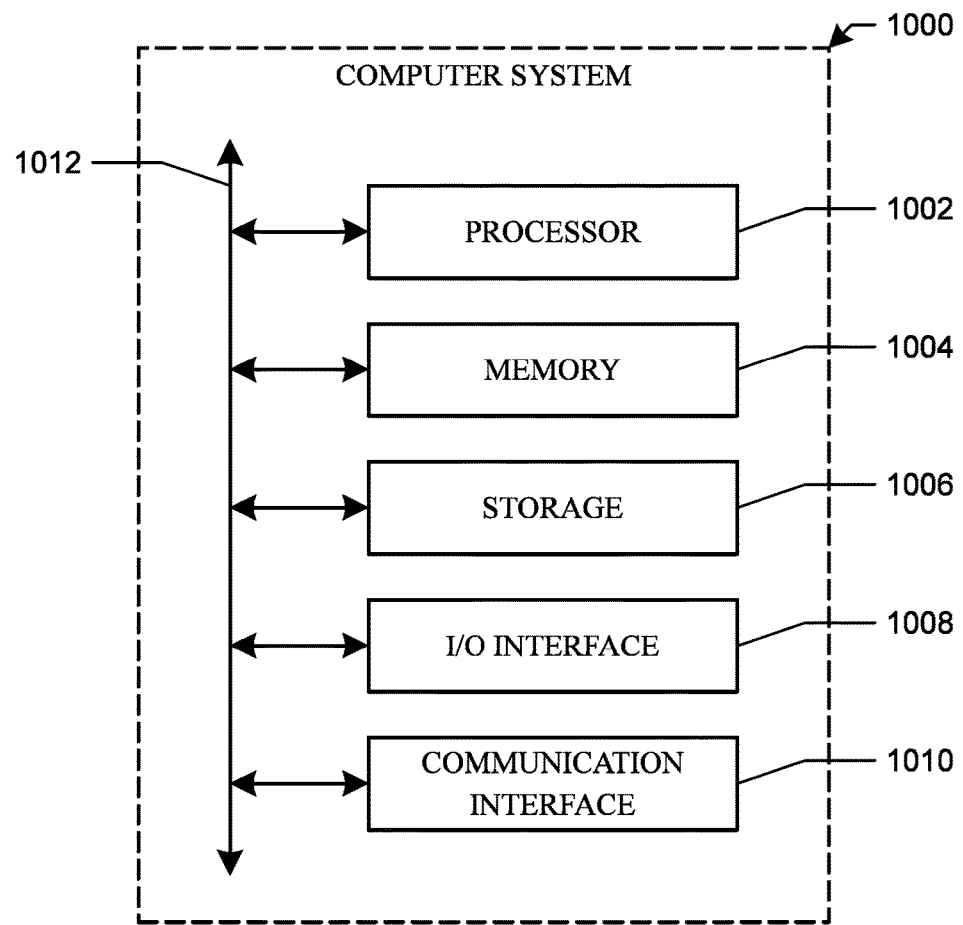
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example, computer system 1000 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, memory 1004 includes random access memory (RAM). This RAM may be volatile memory, where appropriate Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments but should be defined only in accordance with the following claims and their equivalents.

I claim:

1. A communication system comprising:
   a video-conferencing device comprising:
   a camera;
   a microphone array; and
   one or more processors operable to execute instructions from a memory medium, wherein when executing the instructions, the processors perform operations comprising:
      receiving first input audio data and first input video data via a network connection, the audio data and video data being captured at a location remote from the video-conferencing device;
      generating instructions to send the first input audio data and first input video data to a first display device coupled to the video-conferencing device for display;
      capturing, using the camera, output video data of an environment surrounding the video-conferencing device;
      capturing, using the microphone array, output audio data of the environment surrounding the video-conferencing device;
      generating instructions to send the output video data and the output audio data via the network connection to a remotely located receiving device;
      generating instructions to offer a remote application program interface (API) to one or more third-party entities, wherein the remote API allows the one or more third-party entities to control a tilt of the camera or a zoom of the camera via the network connection;
      receiving a remote API request via the network connection from a remote participant of a current video-communication session to tilt or adjust the zoom of the camera; and
      in response to the remote API request, tilting or adjusting the view of the camera in accordance with the remote request.

2. The communication system of claim 1, wherein the processors, when executing the instructions, further perform operations comprising:
   receiving a voice command from a user of the video-conferencing device through the microphone array;
   categorizing the voice command into one of a plurality of predetermined voice-command categories, the plurality of predetermined voice-command categories comprising calling a contact of the user, launching an application, retrieving information from the Internet, playing music, playing video, or starting a video-conferencing session.

3. The communication system of claim 1, wherein the video-conferencing device further comprises one or more physical buttons for disabling the camera or the microphone array at a hardware level.

4. The communication system of claim 1, wherein the processors, when executing the instructions, further perform operations comprising:
receiving an indication from a user to transfer a communication session from a personal device to the video-conferencing device, wherein the indication comprises a swipe on a touch screen of the personal device;
in response to receiving the indication, transferring the communication session from the personal device to the video-conferencing device without an interruption in the communication session.

5. The communication system of claim 1, wherein the processors, when executing the instructions, further perform operations comprising:
receiving user input indicating a change in direction of the camera; and
tilting the camera in accordance with the user input.

6. The communication system of claim 1, wherein the processors, when executing the instructions, further perform operations comprising generating instructions to switch to a dual-screen mode, wherein in the dual-screen mode, second input video data and second input audio data are sent to a second display device coupled to the video-conferencing device and the first display device via one or more wired connections.

7. The communication system of claim 1, wherein the processors, when executing the instructions, further perform operations comprising generating instructions to integrate a digital whiteboarding functionality into a dual-screen mode, wherein the digital whiteboarding functionality comprises:
receiving user-generated content from a personal device of a participant in a video-conferencing session;
generating instructions to send the user-generated content the first display device and to a remotely located receiving device.

8. The communication system of claim 1, wherein a video depicting one or more participants of a video-conferencing session is displayed on the first display screen at the same time as a user-generated content is displayed on the first display screen.

9. The communication system of claim 1, wherein the processors, when executing the instructions, further perform operations comprising:
accessing information in a third-party database; and
generating instructions to send the information in the third-party database to a first display device coupled to the video-conferencing device via a wired connection.

10. The communication system of claim 1, wherein the processors, when executing the instructions, further perform operations comprising:
receiving a voice command from a user of the video-conferencing device through the microphone array;
analyzing a waveform of the voice command;
based on the analysis of the waveform of the voice command, matching the voice command to a user of the video-conferencing device.

11. The communication system of claim 1, wherein the processors, when executing the instructions, further perform operations comprising:
receiving an indication from a user to transfer a communication session from a personal device to the video-conferencing device;
detecting that multiple video-conferencing devices are available to handle the transfer of the communication session;
determining a closest video-conferencing device of the multiple video-conferencing devices; and
transferring the communication session from the personal device to the closest video-conferencing device without an interruption in the communication session.

12. A method, comprising, by one or more computing devices associated with a video-conferencing device:
receiving first input audio data and first input video data via a network connection, the audio data and video data being captured at a location remote from the video-conferencing device;
generating instructions to send the first input audio data and first input video data to a first display device coupled to the video-conferencing device for display;
capturing, using the camera, output video data of an environment surrounding the video-conferencing device;
capturing, using the microphone array, output audio data of the environment surrounding the video-conferencing device;
generating instructions to send the output video data and the output audio data via the network connection to a remotely located receiving device;
generating instructions to offer a remote application program interface (API) to one or more third-party entities, wherein the remote API allows the one or more third-party entities to control a tilt of the camera or a zoom of the camera via the network connection;
receiving a remote API request via the network connection from a remote participant of a current video-communication session to tilt or adjust the zoom of the camera; and
in response to the remote API request, tilting or adjusting the view of the camera in accordance with the remote request.

13. The method of claim 12, further comprising:
receiving a voice command from a user of the video-conferencing device through the microphone array;
categorizing the voice command into one of a plurality of predetermined voice-command categories, the plurality of predetermined voice-command categories comprising calling a contact of the user, launching an application, retrieving information from the Internet, playing music, playing video, or starting a video-conferencing session.

14. The method of claim 12, wherein the video-conferencing device comprises an operating system that operates in at least two modes, the at least two modes comprising a gaming mode and a video streaming mode.

15. The method of claim 12, further comprising:
receiving an indication from a user to transfer a communication session from a personal device to the video-conferencing device, wherein the indication comprises and only comprises a swipe on a touch screen of the personal device;
in response to receiving the indication, transferring the communication session from the personal device to the video-conferencing device without an interruption in the communication session.

16. The method of claim 12, wherein the processors, when executing the instructions, further perform operations comprising generating instructions to switch to a dual-screen mode, wherein in the dual-screen mode, second input video data and second input audio data are sent to a second display device coupled to the video-conferencing device and the first display device via one or more wired connections.

17. A non-transitory computer-readable storage medium comprising software with instructions encoded thereon that, when executed by a processor, cause the processor to:
receive first input audio data and first input video data via a network connection, the audio data and video data being captured at a location remote from the video-conferencing device;
generate instructions to send the first input audio data and first input video data to a first display device coupled to the video-conferencing device for display;
capture, using the camera, output video data of an environment surrounding the video-conferencing device;
capture, using the microphone array, output audio data of the environment surrounding the video-conferencing device;
generate instructions to send the output video data and the output audio data via the network connection to a remotely located receiving device;
generate instructions to offer a remote application program interface (API) to one or more third-party entities, wherein the remote API allows the one or more third-party entities to control a tilt of the camera or a zoom of the camera via the network connection;
receive a remote API request via the network connection from a remote participant of a current video-communication session to tilt or adjust the zoom of the camera; and
in response to the remote API request, tilt or adjust the view of the camera in accordance with the remote request.

18. The non-transitory computer-readable storage medium of claim 17, wherein the instructions, further cause the processor to:
receive a voice command from a user of the video-conferencing device through the microphone array;
categorize the voice command into one of a plurality of predetermined voice-command categories, the plurality of predetermined voice-command categories comprising calling a contact of the user, launching an application, retrieving information from the Internet, playing music, playing video, or starting a video-conferencing session.

19. The non-transitory computer-readable storage medium of claim 17, wherein the video-conferencing device comprises an operating system that operates in at least two modes, the at least two modes comprising a gaming mode and a video streaming mode.

20. The non-transitory computer-readable storage medium of claim 17, wherein the instructions, further cause the processor to:
receive an indication from a user to transfer a communication session from a personal device to the video-conferencing device, wherein the indication comprises and only comprises a swipe on a touch screen of the personal device;
in response to receiving the indication, transfer the communication session from the personal device to the video-conferencing device without an interruption in the communication session.

* * * * *